(12) United States Patent
Low

(10) Patent No.: US 11,773,308 B2
(45) Date of Patent: *Oct. 3, 2023

(54) COMPOSITIONS

(71) Applicant: MEXICHEM FLUOR S.A DE C.V., San Luis Potosi (MX)

(72) Inventor: Robert E. Low, Chesire (GB)

(73) Assignee: MEXICHEM FLUOR S.A DE C.V., San Luis Potosi (MX)

( * ) Notice: Subject to any disclaimer, the term of this patent is extended or adjusted under 35 U.S.C. 154(b) by 0 days.

This patent is subject to a terminal disclaimer.

(21) Appl. No.: 17/465,304

(22) Filed: Sep. 2, 2021

(65) Prior Publication Data

US 2021/0395589 A1 Dec. 23, 2021

Related U.S. Application Data

(63) Continuation of application No. 16/637,194, filed as application No. PCT/GB2018/052243 on Aug. 6, 2018, now Pat. No. 11,136,482.

(30) Foreign Application Priority Data

Aug. 10, 2017 (GB) ..................................... 1712813

(51) Int. Cl.
*C09K 5/04* (2006.01)
*C09K 3/30* (2006.01)

(52) U.S. Cl.
CPC ................ *C09K 5/045* (2013.01); *C09K 3/30* (2013.01); *C09K 2205/126* (2013.01); *C09K 2205/22* (2013.01); *C09K 2205/40* (2013.01)

(58) Field of Classification Search
CPC .... C09K 5/045; C09K 3/30; C09K 2205/126; C09K 2205/22; C09K 2205/40; C10M 171/008; C11D 7/5018
USPC ........ 252/67, 68, 69, 364; 62/467, 498, 364; 510/408, 412; 60/643, 531
See application file for complete search history.

(56) References Cited

U.S. PATENT DOCUMENTS

| 10,072,194 | B2 * | 9/2018 | Tasaka | ................ C09K 5/045 |
| 10,239,804 | B2 | 3/2019 | George | |
| 11,136,482 | B2 * | 10/2021 | Low | .................. C09K 5/045 |
| 2011/0252801 | A1 | 10/2011 | Minor | |
| 2011/0253927 | A1 | 10/2011 | Minor | |
| 2015/0376486 | A1 | 12/2015 | Hashimoto | |
| 2016/0002518 | A1 | 1/2016 | Taniguchi | |
| 2016/0017110 | A1 | 1/2016 | Singh | |
| 2016/0097569 | A1 | 4/2016 | Matsunaga | |
| 2016/0187038 | A1 | 6/2016 | Toyooka | |
| 2016/0340565 | A1 * | 11/2016 | Tasaka | .................. C09K 5/045 |
| 2018/0251416 | A1 | 9/2018 | George | |
| 2018/0290951 | A1 | 10/2018 | Tomiyori | |
| 2018/0355209 | A1 | 12/2018 | Johnston | |
| 2018/0355269 | A1 | 12/2018 | Low | |
| 2018/0362441 | A1 | 12/2018 | Low | |
| 2019/0113256 | A1 | 4/2019 | Mizuno | |
| 2019/0178544 | A1 | 6/2019 | Harkins | |
| 2020/0255761 | A1 | 8/2020 | Low | |
| 2021/0395590 | A1 * | 12/2021 | Low | .................. C10M 171/008 |
| 2023/0110292 | A1 * | 4/2023 | Itano | ...................... C09K 5/045 252/67 |
| 2023/0132359 | A2 | 4/2023 | Kumakura et al. | |

FOREIGN PATENT DOCUMENTS

| EP | 3109292 A1 | 12/2016 | |
| WO | WO-2015125874 A1 * | 8/2015 | ............. C09K 5/045 |
| WO | WO 2017/098234 A1 | 6/2017 | |
| WO | WO 2017/098238 A1 | 6/2017 | |
| WO | WO 2017/122222 A2 | 7/2017 | |
| WO | WO 2018/100586 A1 | 6/2018 | |
| WO | WO 2020/017386 A1 | 1/2020 | |
| WO | WO 2020/017520 A1 | 1/2020 | |
| WO | WO 2020/017521 A1 | 1/2020 | |
| WO | WO 2020/017522 A1 | 1/2020 | |

OTHER PUBLICATIONS

Written Opinion dated Oct. 23, 2018 from PCT/GB2018/052243.
International Search Report dated Oct. 23, 2018 from PCT/GB2018/052243.
Communication Pursuant to Article 94(3) EPC dated Jan. 26, 2021 and appended Annex to Communication dated Jan. 26, 2021 (four pages total) from corresponding European Patent Application 18 759 679.6.

* cited by examiner

*Primary Examiner* — Douglas J McGinty
(74) *Attorney, Agent, or Firm* — Crowell & Moring LLP

(57) ABSTRACT

The invention provides a composition comprising 1,1-difluoroethene (R-1132a), difluoromethane (R-32), 2,3,3,3-tetrafluoropropene (R-1234yf), optionally carbon dioxide ($CO_2$, R-744), and, optionally, 1,1,2-trifluoroethene (R-1123).

52 Claims, No Drawings

COMPOSITIONS

The present application is a continuation of U.S. patent application Ser. No. 16/637,194, filed Feb. 6, 2020, which is the national phase of International Application No. PCT/GB2018/052243, filed Aug. 6, 2018, which claims priority to United Kingdom Patent Application No. 1712813.3, filed Aug. 10, 2017, the entireties of all of which are incorporated by reference herein.

FIELD

The invention relates to compositions, preferably to heat transfer compositions which may be suitable as replacements for existing refrigerants such as R-410A.

The listing or discussion of a prior-published document or any background in the specification should not necessarily be taken as an acknowledgement that a document or background is part of the state of the art or is common general knowledge.

Mechanical refrigeration systems and related heat transfer devices such as heat pumps and air-conditioning systems are well known. In such systems, a refrigerant liquid evaporates at low pressure taking heat from the surrounding zone. The resulting vapour is then compressed and passed to a condenser where it condenses and gives off heat to a second zone, the condensate being returned through an expansion valve to the evaporator, so completing the cycle. Mechanical energy required for compressing the vapour and pumping the liquid is provided by, for example, an electric motor or an internal combustion engine.

Residential and light commercial air-conditioning and heat pump units are commonly charged with the non-flammable refrigerant R-410A, a mixture of R-32 (difluoromethane) and R-125 (pentafluoroethane). Although the use of this refrigerant results in high system efficiency and hence low energy consumption, the greenhouse (or global) warming potential (GWP) of R-410A is high (2100, using the IPCC AR4 data set).

R-32 (difluoromethane) has been proposed as an alternative to R-410A. R-32 is classed as mildly flammable ("2L" using the ASHRAE classification system). It offers comparable energy efficiency to R-410A in appropriately designed equipment and has a GWP of 675. However, R-32 has a number of disadvantages: its compressor discharge temperatures are significantly higher than R-410A and its operating pressures can also be higher than for R-410A. Compensating for these higher discharge temperatures, by for example using "demand cooling" or liquid injection technologies is possible. These can however reduce the capacity and energy efficiency of the system. A further disadvantage of R-32 is that its GWP (675) is still high when compared to the GWPs of hydrofluoro-olefin refrigerants such as tetrafluoropropenes or hydrocarbons such as propane.

Binary blends of R-32 with R-1234yf (2,3,3,3-tetrafluoropropene) or R-1234ze(E) (E-1,3,3,3-tetrafluoropropene) and ternary blends of R-32, tetrafluoropropenes (either R-1234ze(E) or R-1234yf) and a third component have also been proposed as alternative fluids. Examples of such fluids include R-454B, which is a binary mixture of R-32/R-1234yf (68.9%/31.1%) with a GWP of 466, and R-452B, a ternary mixture of R-32/R-125/R-1234yf (67%/7%/26%) with a GWP of 698. These fluids have reduced GWP compared to R-410A and can offer reduced discharge temperature. However, their GWP values are similar to R-32 and still high when compared to the GWPs of hydrofluoro-olefin refrigerants or hydrocarbons.

In looking for alternative low temperature refrigerants, several other factors must also be considered. Firstly, if the fluid is to be used as a retrofit or conversion fluid in existing equipment, or as a "drop-in" to new equipment using an essentially unchanged R-410A system design, then non-flammability is highly desired, as the existing design will have been based on the use of non-flammable fluid.

If an alternative fluid is to be employed in a wholly new system design, then a degree of flammability may be tolerable, but the use of highly flammable fluids may impose cost and performance penalties to mitigate hazards. Acceptable charge size (refrigerant mass) in a system is also governed by the flammability classification of the fluid, with class 3 fluids, such as ethane, being the most strictly limited. In this case a weaker flammability characteristic is highly desirable since it may allow larger system charges.

Thirdly, the typical application of such fluids is in residual or commercial air-conditioning and heat pump units, which are usually located in buildings. It is therefore desirable to have acceptably low toxicity as a characteristic of the fluid.

Furthermore, the volumetric capacity (a measure of the cooling power achievable by a given size of compressor) and energy efficiency are important.

SUMMARY

Thus, there is a need to provide alternative refrigerants having improved properties such as low GWP (so as to reduce the environmental impact of refrigerant leakage), yet possessing acceptable refrigeration performance, flammability characteristics and toxicology. There is also a need to provide alternative refrigerants that may be used in existing devices such as refrigeration devices with little or no modification.

More specifically, it would be advantageous to find refrigerant blends having comparable performance (capacity and energy efficiency, expressed as COP) to R-410A with compressor discharge temperature comparable to that of R-452B or R-454A but with a GWP significantly lower than that of R-32. As R-32 and R-454B are both considered weakly flammable blends (flammability class "2L" according to ASHRAE Standard 34), it would also be desirable that such lower-GWP blends would be of flammability class 2L.

The subject invention addresses the above and other deficiencies, and the above needs, by the provision of a composition comprising 1,1-difluoroethene (R-1132a), difluoromethane (R-32), 2,3,3,3-tetrafluoropropene (R-1234yf), optionally carbon dioxide ($CO_2$, R-744), and, optionally, 1,1,2-trifluoroethene (R-1123). Such compositions are referred to hereinafter as compositions of the invention.

DETAILED DESCRIPTION

The compositions of the invention typically contain from about 1 or 2 or 3 or 4 to about 60% by weight R-1132a. Advantageously, such compositions comprise from about 1 or 2 or 3 or 4 to about 50% by weight R-1132a, such as from about 1 or 2 or 3 or 4 to about 40% by weight R-1132a, for example from about 1 or 2 or 3 or 4 to about 30% by weight R-1132a. Conveniently, the compositions of the invention comprise from about 1 or 2 or 3 or 4 to about 25% by weight R-1132a, such as from 2 to about 20% by weight R-1132a, for example 3 or 4 to about 20% by weight R-1132a. Preferably, such compositions comprise from about 5 to about 20% by weight R-1132a.

The compositions of the invention typically contain from about 1 to about 99% by weight R-32 or from about 2 to about 98% by weight R-32. Advantageously, such compositions comprise from about 2 to about 95% by weight R-32, such as from about 3 to about 95% by weight R-32. Conveniently, the compositions of the invention comprise from about 5 to about 90% by weight R-32, such as from about 5 to about 85% by weight R-32, for example from about 10 to about 80% by weight R-32. Preferably, such compositions comprise from about 15 to about 75% by weight R-32, such as from about 15 to about 70% by weight R-32.

The compositions of the invention typically contain from about 1 to about 99% by weight R-1234yf or from about 2 to about 98% by weight R-1234yf. Advantageously, such compositions comprise from about 2 to about 90% by weight R-1234yf, such as from 5 to about 90% by weight R-1234yf. Conveniently, the compositions of the invention comprise from about 7 to about 85% by weight R-1234yf, such as from about 8 to about 80% by weight R-1234yf. Preferably, such compositions comprise from about 10 to about 75% by weight R-1234yf, such as from about 10 to about 70% by weight R-1234yf, for example from about 10 to about 65% by weight R-1234yf.

Conveniently, compositions of the invention comprise from about 1 to about 60% by weight R-1132a, from about 1 to about 99% by weight R-32, and from about 1 to about 99% by weight R-1234yf. Such compositions typically contain from about 1 to about 50% by weight R-1132a, from about 2 to about 97% by weight R-32, and from about 2 to about 97% by weight R-1234yf.

Conveniently, compositions of the invention comprise from about 2 to about 60% by weight R-1132a, from about 1 to about 97% by weight R-32, and from about 1 to about 97% by weight R-1234yf. Such compositions typically contain from about 2 to about 50% by weight R-1132a, from about 2 to about 96% by weight R-32, and from about 2 to about 96% by weight R-1234yf.

Advantageously, compositions of the invention comprise from about 1 to about 40% by weight R-1132a, from about 5 to about 90% by weight R-32, and from about 5 to about 90% by weight R-1234yf; or from about 2 to about 40% by weight R-1132a, from about 5 to about 90% by weight R-32, and from about 5 to about 90% by weight R-1234yf; or from about 2 to about 40% by weight R-1132a, from about 4 to about 94% by weight R-32, and from about 4 to about 94% by weight R-1234yf.

Preferably, compositions of the invention comprise from about 3 to about 20% by weight R-1132a, from about 10 to about 80% by weight R-32 and from about 10 to about 75% by weight R-1234yf; or from about 3 to about 30% by weight R-1132a, from about 10 to about 91% by weight R-32 and from about 6 to about 87% by weight R-1234yf.

Conveniently, compositions of the invention comprise from about 5 to about 20% by weight R-1132a, from about 20 to about 70% by weight R-32 and from about 10 to about 65% by weight R-1234yf; or from about 4 to about 25% by weight R-1132a, from about 15 to about 88% by weight R-32 and from about 8 to about 81% by weight R-1234yf.

Any of the above described compositions may additionally contain carbon dioxide (R-744, $CO_2$). Adding R-744 has the advantage of reducing the R-1132a in the vapour phase and hence reducing potential flammability of the vapour phase, but tends to increase compressor discharge temperature and temperature glide.

When present, the compositions of the invention typically contain from about 1 to about 20% by weight $CO_2$. Preferably, such compositions contain from about 2 to about 15% by weight $CO_2$. In one embodiment, the compositions of the invention contain R-1132a and $CO_2$ in a combined amount of from about 2 to about 50% by weight, such as from about 2 to about 40% by weight, for instance from about 4 to about 30% by weight, e.g. from about 5 to about 20% by weight.

Any of the above described compositions may additionally contain 1,1,2-trifluoroethene (R-1123). An advantage of using R-1123 in the compositions of the invention is that it gives similar capacity to R-32 but it has negligible GWP. By incorporation of a proportion of R-1123 the overall GWP of a composition having similar capacity to R-410A may then be reduced compared to an equivalent ternary R-1132a/R-32/R-1234yf composition at constant R-1132a and R-1234yf proportions. R-1123 may only safely be used as a diluted component in compositions of the invention. The proportion of R-1123 in the compositions of the typically is such that the maximum molar concentration of R-1123 either in the composition of the invention as formulated or in its worst-case fractionated compositions (as defined in ASHRAE Standard 34 Appendix B) should be less than 40%.

When present, the compositions of the invention typically contain from about 1 to about 30% by weight R-1123; or from about 5 to about 30% by weight R-1123. Preferably, such compositions contain from about 5 to about 20% by weight R-1123 such as from about 5 to about 15% by weight, for example from about 5 to about 10% by weight R-1123.

Alternatively, the compositions of the invention may contain less than about 8% or about 7% or about 6% or about 5% by weight R-1123, such as less than about 4% or about 3% by weight R-1132a, for example less than about 2% or about 1% by weight R-1123. Preferably, such compositions are substantially free of R-1123. Advantageously, the compositions of the invention contain no (readily detectable) R-1123.

Any of the above described compositions may further contain a hydrocarbon. Advantageously, the hydrocarbon is one or more compound(s) selected from the group consisting of ethane, propane, propene, isobutane, n-butane, n-pentane, isopentane and mixtures thereof. Without being bound by theory, it is believed that, when present, the inclusion of ethane and/or an additional hydrocarbon compound may enhance oil miscibility, solubility and/or return characteristics. Typically, the compositions of the invention contain from about 1 to about 20% by weight hydrocarbon component, such as from about 1 to about 10% by weight, for example from about 1 to about 5% by weight.

In an embodiment, the compositions may consist essentially of the stated components. By the term "consist essentially of", we include the meaning that the compositions of the invention contain substantially no other components, particularly no further (hydro)(fluoro)compounds (e.g. (hydro)(fluoro)alkanes or (hydro)(fluoro)alkenes) known to be used in heat transfer compositions. The term "consist of" is included within the meaning of "consist essentially of".

In an embodiment, the compositions of the invention are substantially free of any component that has heat transfer properties (other than the components specified). For instance, the compositions of the invention may be substantially free of any other hydrofluorocarbon compound.

By "substantially no" and "substantially free of", we include the meaning that the compositions of the invention contain 0.5% by weight or less of the stated component, preferably 0.4%, 0.3%, 0.2% or 0.1% or less, based on the total weight of the composition.

All of the chemicals herein described are commercially available. For example, the fluorochemicals may be obtained from Apollo Scientific (UK) and carbon dioxide may be obtained from liquefied gas suppliers such as Linde AG.

As used herein, all % amounts mentioned in compositions herein, including in the claims, are by weight based on the total weight of the compositions, unless otherwise stated.

By the term "about", as used in connection with numerical values of amounts of components in % by weight, we include the meaning of ±0.5% by weight, for example ±0.5% by weight.

For the avoidance of doubt, it is to be understood that the stated upper and lower values for ranges of amounts of components in the compositions of the invention described herein may be interchanged in any way, provided that the resulting ranges fall within the broadest scope of the invention.

The compositions of the invention have zero ozone depletion potential.

Typically, the compositions of the invention have a GWP of less than about 650, such as less than about 600, for example less than about 500. Preferably, the compositions of the invention have a GWP of less than about 480, such as less than about 450, for example less than about 400.

Typically, the compositions of the invention are of reduced flammability hazard when compared to R-1132a.

Flammability may be determined in accordance with ASHRAE Standard 34 incorporating the ASTM Standard E-681 with test methodology as per Addendum 34p dated 2004, the entire content of which is incorporated herein by reference.

In one aspect, the compositions have one or more of (a) a higher lower flammable limit; (b) a higher ignition energy (sometimes referred to as auto ignition energy or pyrolysis); or (c) a lower flame velocity compared to R-1132a alone. Preferably, the compositions of the invention are less flammable compared to R-1132a in one or more of the following respects: lower flammable limit at 23° C.; lower flammable limit at 60° C.; breadth of flammable range at 23° C. or 60° C.; auto-ignition temperature (thermal decomposition temperature); minimum ignition energy in dry air or flame speed. The flammable limits being determined according to the methods specified in ASHRAE-34 and the auto-ignition temperature being determined in a 500 ml glass flask by the method of ASTM E659-78.

In a preferred embodiment, the compositions of the invention are non-flammable. For example, the compositions of the invention are non-flammable at a test temperature of 60° C. using the ASHRAE-34 methodology. Advantageously, the mixtures of vapour that exist in equilibrium with the compositions of the invention at any temperature between about −20° C. and 60° C. are also non-flammable.

In some applications it may not be necessary for the formulation to be classed as non-flammable by the ASHRAE-34 methodology. It is possible to develop fluids whose flammability limits will be sufficiently reduced in air to render them safe for use in the application, for example if it is physically not possible to make a flammable mixture by leaking the refrigeration equipment charge into the surrounds.

In one embodiment, the compositions of the invention have a flammability classifiable as 1 or 2L according to the ASHRAE standard 34 classification method, indicating non-flammability (class 1) or a weakly flammable fluid with flame speed lower than 10 cm/s (class 2L).

The compositions of the invention preferably have a temperature glide in an evaporator or condenser of less than about 10K, even more preferably less than about 5K, and even more preferably less than about 1K.

It is believed that the compositions of the invention exhibit a completely unexpected combination of low-/non-flammability, low GWP, improved lubricant miscibility and improved refrigeration performance properties. Some of these refrigeration performance properties are explained in more detail below.

The compositions of the invention typically have a volumetric refrigeration capacity that is at least 80% of that of R-410A, such as at least 85% of that of R-410A. Preferably, the compositions of the invention have a volumetric refrigeration capacity that is at least 90% of that of R-410A, for example from about 95% to about 130% of that of R-410A.

In one embodiment, the cycle efficiency (Coefficient of Performance, COP) of the compositions of the invention is within about 7% of R-410A such as within 5% of R-410A. Preferably, the cycle efficiency is equivalent to or higher than R-410A.

Conveniently, the compressor discharge temperature of the compositions of the invention is within about 15K of the existing refrigerant fluid it is replacing (e.g. R-410A or R-32, preferably about 10K or even about 5K. Advantageously, the compressor discharge temperature of the compositions of the invention is lower than that of R-32.

Conveniently, the operating pressure in a condenser containing a composition of the invention is lower than that of the condenser containing R-32.

The compositions of the invention are typically suitable for use in existing designs of equipment, and are compatible with all classes of lubricant currently used with established HFC refrigerants. They may be optionally stabilised or compatibilised with mineral oils by the use of appropriate additives.

Preferably, when used in heat transfer equipment, the composition of the invention is combined with a lubricant.

Conveniently, the lubricant is selected from the group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof. PAGs and POEs are currently preferred lubricants for the compositions of the invention.

Advantageously, the lubricant further comprises a stabiliser.

Preferably, the stabiliser is selected from the group consisting of diene-based compounds, phosphates, phenol compounds and epoxides, and mixtures thereof.

Conveniently, the composition of the invention may be combined with a flame retardant.

Advantageously, the flame retardant is selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

In one embodiment, the invention provides a heat transfer device comprising a composition of the invention. Preferably, the heat transfer device is a refrigeration device.

Conveniently, the heat transfer device is a residential or commercial air conditioning system, a heat pump or a commercial or industrial refrigeration system.

The invention also provides the use of a composition of the invention in a heat transfer device, such as a refrigeration system, as herein described.

According to another aspect of the invention, there is provided a sprayable composition comprising a material to be sprayed and a propellant comprising a composition of the invention.

According to a further aspect of the invention, there is provided a method for cooling an article which comprises condensing a composition of the invention and thereafter evaporating said composition in the vicinity of the article to be cooled.

According to another aspect of the invention, there is provided a method for heating an article which comprises condensing a composition of the invention in the vicinity of the article to be heated and thereafter evaporating said composition.

According to a further aspect of the invention, there is provided a method for extracting a substance from biomass comprising contacting the biomass with a solvent comprising a composition of the invention, and separating the substance from the solvent.

According to another aspect of the invention, there is provided a method of cleaning an article comprising contacting the article with a solvent comprising a composition of the invention.

According to a further aspect of the invention, there is provided a method for extracting a material from an aqueous solution comprising contacting the aqueous solution with a solvent comprising a composition of the invention, and separating the material from the solvent.

According to another aspect of the invention, there is provided a method for extracting a material from a particulate solid matrix comprising contacting the particulate solid matrix with a solvent comprising a composition of the invention, and separating the material from the solvent.

According to a further aspect of the invention, there is provided a mechanical power generation device containing a composition of the invention.

Preferably, the mechanical power generation device is adapted to use a Rankine Cycle or modification thereof to generate work from heat.

According to another aspect of the invention, there is provided a method of retrofitting a heat transfer device comprising the step of removing an existing heat transfer fluid, and introducing a composition of the invention. Preferably, the heat transfer device is a refrigeration device, such as an ultra-low temperature refrigeration system. Advantageously, the method further comprises the step of obtaining an allocation of greenhouse gas (e.g. carbon dioxide) emission credit.

In accordance with the retrofitting method described above, an existing heat transfer fluid can be fully removed from the heat transfer device before introducing a composition of the invention. An existing heat transfer fluid can also be partially removed from a heat transfer device, followed by introducing a composition of the invention.

The compositions of the invention may also be prepared simply by mixing the R-1132a, R-32, R-1234yf (and optional components such as R-744, R-1123, hydrocarbons, a lubricant, a stabiliser or an additional flame retardant) in the desired proportions. The compositions can then be added to a heat transfer device (or used in any other way as defined herein).

In a further aspect of the invention, there is provided a method for reducing the environmental impact arising from operation of a product comprising an existing compound or composition, the method comprising replacing at least partially the existing compound or composition with a composition of the invention.

By environmental impact we include the generation and emission of greenhouse warming gases through operation of the product.

As mentioned above, this environmental impact can be considered as including not only those emissions of compounds or compositions having a significant environmental impact from leakage or other losses, but also including the emission of carbon dioxide arising from the energy consumed by the device over its working life. Such environmental impact may be quantified by the measure known as Total Equivalent Warming Impact (TEWI). This measure has been used in quantification of the environmental impact of certain stationary refrigeration and air conditioning equipment, including for example supermarket refrigeration systems.

The environmental impact may further be considered as including the emissions of greenhouse gases arising from the synthesis and manufacture of the compounds or compositions. In this case the manufacturing emissions are added to the energy consumption and direct loss effects to yield the measure known as Life-Cycle Carbon Production (LCCP). The use of LCCP is common in assessing environmental impact of automotive air conditioning systems.

In a preferred embodiment, the use of the composition of the invention results in the equipment having a lower Total Equivalent Warming Impact, and/or a lower Life-Cycle Carbon Production than that which would be attained by use of the existing compound or composition.

These methods may be carried out on any suitable product, for example in the fields of air-conditioning, refrigeration (e.g. low and ultra-low temperature refrigeration), heat transfer, aerosols or sprayable propellants, gaseous dielectrics, flame suppression, solvents (e.g. carriers for flavorings and fragrances), cleaners, topical anesthetics, and expansion applications. Preferably, the field is refrigeration.

Examples of suitable products include heat transfer devices, sprayable compositions, solvents and mechanical power generation devices. In a preferred embodiment, the product is a heat transfer device, such as a refrigeration device.

The existing compound or composition has an environmental impact as measured by GWP and/or TEWI and/or LCCP that is higher than the composition of the invention which replaces it. The existing compound or composition may comprise a fluorocarbon compound, such as a per-fluoro-, hydrofluoro-, chlorofluoro- or hydrochlorofluoro-carbon compound or it may comprise a fluorinated olefin.

Preferably, the existing compound or composition is a heat transfer compound or composition such as a refrigerant. Examples of refrigerants that may be replaced include R-410A, R454B, R-452B and R-32, preferably R-410A.

Any amount of the existing compound or composition may be replaced so as to reduce the environmental impact. This may depend on the environmental impact of the existing compound or composition being replaced and the environmental impact of the replacement composition of the invention. Preferably, the existing compound or composition in the product is fully replaced by the composition of the invention.

The invention is illustrated by the following non-limiting examples.

EXAMPLES

Ternary Mixtures of R-1132a, R-32 and R-1234yf

A thermodynamic model was constructed to allow estimation of the performance of compositions comprising R-1132a or $CO_2$ in a vapour compression refrigeration or air conditioning cycle. The critical temperature of R-1132a is about 30° C. and that of $CO_2$ is about 31° C.; both are lower than the condensing temperatures experienced in many applications of R-410A, which could range from 30 to 60° C. Therefore, a thermodynamic model was developed that is capable of predicting vapour-liquid equilibrium of mixtures at temperatures above the critical temperature of some components in the mixture.

The chosen model used the Peng-Robinson equation of state for calculation of the mixtures' thermodynamic properties. The vapour-liquid equilibrium (VLE) of mixtures was correlated using the Peng-Robinson equation of state coupled with the mixing rules of Wong and Sandler as described in Orbey, H., & Sandler, S. (1998), Modeling Vapor-Liquid Equilibria: Cubic Equations of State and their Mixing Rules, Cambridge: Cambridge University Press, which is included herein by reference. This type of thermodynamic model has been used with success for modelling the VLE of refrigerant mixtures (Shiflett, M., & Sandler, S. (1998), Modeling Fluorocarbon Vapor-Liquid Equilibria using the Wong-Sandler Model, Fluid Phase Equilibria, 145-162, incorporated herein by reference) and for modelling VLE of mixtures where one of the species is above its critical temperature (Valtz, A., Coquelet, C., & Richon, D. (2007), Vapor-liquid equilibrium data for the hexafluoroethane+carbon dioxide system at temperatures from 253 to 297K and pressures up to 6.5 MPa, Fluid Phase Equilibria, 179-185, incorporated herein by reference). The Wong-Sandler model also allows reliable prediction of mixture VLE at higher temperatures and pressures than those used to generate experimental data used in regression of its mixture parameters, by coupling a model of the free energy of the liquid phase to the equation of state parameters. This makes it suitable for the estimation of vapour compression cycle performance for the contemplated mixtures.

In this work the Wong-Sandler mixing rules were used with the non-random two-liquid (NRTL) model to represent the free energy of the liquid phase. The Peng-Robinson equation's parameters for each mixture component were modified to use the temperature correlation of Mathias and Copeman, so as accurately to represent the component vapour pressures.

The interaction parameters of the Wong-Sandler/NRTL model were regressed to experimental measurements of vapour liquid equilibrium for binary mixtures of R-1132a with $CO_2$, R-32 and R-1234yf. The experimental measurements' temperature range used varied from −55 to +10° C. for R-1132a/$OO_2$ and R-1132a/R-32 mixtures, to −40 to +40° C. for R-1132a/R-1234yf mixtures. The data for these mixtures and for binary mixtures of R1234yf with R-32 and $CO_2$ were measured using a static-synthetic equilibrium cell.

Literature data were also available for the VLE of R-32 with $CO_2$ (Rivollet, F., Chapoy, C., Coquelet, C., & Richon, D. (2004), Vapor-liquid equilibrium data for the carbon dioxide (CO2)+difluoromethane (R32) system at temperatures form 283.12 to 343.25 K and pressures up to 7.46 MPa, Fluid Phase Equilibria, 95-101, incorporated herein by reference) (Adams R A, Stein F P. (1971), Vapor-Liquid Equilibria for Carbon Dioxide-Difluoromethane System, Journal of Chemical Engineering Data, 1146-149., incorporated herein by reference) and for R-1234yf with $CO_2$ (Juntarachat, N. et al. (2014), Experimental measurements and correlation of vapor-liquid equilibrium and critical data for the $CO_2$+R1234yf and $CO_2$+R1234ze(E) binary mixtures, International Journal of Refrigeration, 141-152, incorporated herein by reference) and were used in the parameter regression.

Cycle modelling was carried out using state points from the modelling matrix proposed by AHRI's Low-GWP Alternative Refrigerants Evaluation Programme. The conditions used are given in Table 1 below:

TABLE 1

Cycle conditions for R-1132a/R-32/R-124yf ternary system modelling

| Cycle conditions for modelling | | R410A |
|---|---|---|
| Mean condenser temperature | ° C. | 37.8 |
| Mean evaporator temperature | ° C. | 4.4 |
| Condenser subcooling | K | 5.6 |
| Evaporator superheat | K | 5.6 |
| Evaporator pressure drop | bar | 0.00 |
| Suction line pressure drop | bar | 0.00 |
| Condenser pressure drop | bar | 0.00 |
| Compressor suction superheat | K | 0.00 |
| Isentropic efficiency | | 70.0% |

In order to validate that the thermodynamic model gave reasonable results, a comparison was carried out by using the industry standard NIST REFPROP9.1 program to simulate cycle performance for R-410A. The Mexichem thermodynamic model was then used to calculate the cycle performance. Results are shown in Table 2, below.

TABLE 2

Comparison of REFPROP and Mexichem thermodynamic model results

| Results | | REFPROP | MEXICHEM |
|---|---|---|---|
| COP | | 4.8 | 4.8 |
| Volumetric capacity | kJ/m$^3$ | 5999 | 5996 |
| Pressure ratio | | 2.5 | 2.5 |
| Compressor discharge temperature | ° C. | 66.6 | 69.3 |
| Evaporator inlet pressure | bar | 9.2 | 9.3 |
| Condenser inlet pressure | bar | 22.9 | 22.9 |
| Evaporator inlet temperature | ° C. | 4.4 | 4.4 |
| Evaporator glide (out-in) | K | 0.1 | 0.1 |
| Condenser glide (in-out) | K | 0.1 | 0.1 |

Comparative calculations of the performance of R-32 and R-454B were first carried out using the model. The results are shown in Table 3 below.

TABLE 3

Refrigeration performance modelling data of R-32 and R-454B relative to R-410A

| Parameter | Units | R410A | R32 | R-454B |
|---|---|---|---|---|
| Coefficient of Performance (COP) | | 4.85 | 4.89 | 5.06 |
| Volumetric cooling capacity | kJ/m$^3$ | 5996 | 6490 | 5823 |
| Discharge temperature | ° C. | 69.3 | 88.6 | 74.9 |
| Condenser pressure | bar | 22.9 | 23.5 | 21.1 |
| Evaporator pressure | bar | 9.3 | 9.4 | 8.6 |
| Pressure ratio | | 2.45 | 2.51 | 2.46 |
| Condenser glide | K | 0.2 | 0.0 | 1.4 |
| Evaporator glide | K | 0.1 | 0.0 | 1.5 |
| COP relative to reference | | 100% | 101% | 104% |
| Capacity relative to reference | | 100% | 108% | 97% |
| Discharge temperature difference from reference | | 0 | 19.4 | 5.7 |
| GWP | | 2100 | 675 | 466 |

Next a series of compositions of R-1132a/R-32/R-1234yf ranging from 5-20% R-1132a and 20-70% R-32 were analysed. The results are shown in Tables 4-7 below. The compositions of each component are given in weight percentages in these tables.

TABLE 4

Refrigeration performance modelling data for
R-1132a/R-32/R-1234yf ternary system containing 5% R-1132a

| Parameter | Units | R-1132a | | | | |
|---|---|---|---|---|---|---|
| | | 5 | 5 | 5 | 5 | 5 |
| | | | | R32 | | |
| | | 30 | 40 | 50 | 60 | 70 |
| | | | | R1234yf | | |
| | | 65 | 55 | 45 | 35 | 25 |
| Coefficient of Performance (COP) | | 5.14 | 5.10 | 5.07 | 5.04 | 5.01 |
| Volumetric cooling capacity | kJ/m³ | 4843 | 5288 | 5676 | 6011 | 6290 |
| Discharge temperature | ° C. | 65.2 | 68.3 | 71.2 | 74.1 | 77.2 |
| Condenser pressure | bar | 17.8 | 19.4 | 20.8 | 22.0 | 22.9 |
| Evaporator pressure | bar | 7.0 | 7.7 | 8.4 | 8.9 | 9.3 |
| Pressure ratio | | 2.53 | 2.50 | 2.48 | 2.46 | 2.45 |
| Condenser glide | K | 8.5 | 6.8 | 5.2 | 3.9 | 2.9 |
| Evaporator glide | K | 7.9 | 6.6 | 5.1 | 3.8 | 2.8 |
| COP relative to reference | | 106% | 105% | 104% | 104% | 103% |
| Capacity relative to reference | | 81% | 88% | 95% | 100% | 105% |
| Discharge temperature difference from reference | | −4.0 | −1.0 | 1.9 | 4.8 | 7.9 |
| GWP | | 205 | 272 | 339 | 407 | 474 |

TABLE 4

Refrigeration performance modelling data for R-1132a/R-32/R-1234yf
ternary system containing 10% R-1132a

| Parameter | Units | R-1132a | | | | |
|---|---|---|---|---|---|---|
| | | 10 | 10 | 10 | 10 | 10 |
| | | | | R32 | | |
| | | 30 | 40 | 50 | 60 | 70 |
| | | | | R1234yf | | |
| | | 60 | 50 | 40 | 30 | 20 |
| Coefficient of Performance (COP) | | 5.08 | 5.04 | 5.02 | 5.00 | 4.98 |
| Volumetric cooling capacity | kJ/m³ | 5275 | 5724 | 6116 | 6452 | 6726 |
| Discharge temperature | ° C. | 67.4 | 70.2 | 72.9 | 75.7 | 78.7 |
| Condenser pressure | bar | 19.6 | 21.2 | 22.6 | 23.8 | 24.6 |
| Evaporator pressure | bar | 7.8 | 8.5 | 9.2 | 9.7 | 10.1 |
| Pressure ratio | | 2.52 | 2.50 | 2.47 | 2.45 | 2.44 |
| Condenser glide | K | 10.0 | 8.0 | 6.3 | 5.0 | 4.0 |
| Evaporator glide | K | 9.4 | 7.8 | 6.2 | 4.9 | 3.9 |
| COP relative to reference | | 105% | 104% | 103% | 103% | 103% |
| Capacity relative to reference | | 88% | 95% | 102% | 108% | 112% |
| Discharge temperature difference from reference | | −1.8 | 0.9 | 3.6 | 6.4 | 9.5 |
| GWP | | 205 | 272 | 339 | 407 | 474 |

TABLE 4

Refrigeration performance modelling data for
R-1132a/R-32/R-1234yf ternary system containing 15% R-1132a

| Parameter | Units | VDF | | | | | |
|---|---|---|---|---|---|---|---|
| | | 15 | 15 | 15 | 15 | 15 | 15 |
| | | | | R32 | | | |
| | | 20 | 30 | 40 | 50 | 60 | 70 |
| | | | | R1234yf | | | |
| | | 65 | 55 | 45 | 35 | 25 | 15 |
| Coefficient of Performance (COP) | | 5.04 | 5.02 | 4.99 | 4.97 | 4.96 | 4.94 |
| Volumetric cooling capacity | kJ/m³ | 5181 | 5702 | 6156 | 6553 | 6889 | 7157 |

TABLE 4-continued

Refrigeration performance modelling data for
R-1132a/R-32/R-1234yf ternary system containing 15% R-1132a

| | | VDF | | | | | |
|---|---|---|---|---|---|---|---|
| | | 15 | 15 | 15 | 15 | 15 | 15 |
| | | | | R32 | | | |
| | | 20 | 30 | 40 | 50 | 60 | 70 |
| | | | | R1234yf | | | |
| Parameter | Units | 65 | 55 | 45 | 35 | 25 | 15 |
| Discharge temperature | ° C. | 66.4 | 69.2 | 71.8 | 74.3 | 77.0 | 80 |
| Condenser pressure | bar | 19.5 | 21.4 | 23.1 | 24.5 | 25.6 | 26.4 |
| Evaporator pressure | bar | 7.7 | 8.5 | 9.3 | 10.0 | 10.5 | 10.9 |
| Pressure ratio | | 2.55 | 2.51 | 2.48 | 2.46 | 2.44 | 2.42 |
| Condenser glide | K | 13.0 | 10.8 | 8.7 | 6.9 | 5.6 | 4.8 |
| Evaporator glide | | 12.0 | 10.5 | 8.8 | 7.1 | 5.7 | 4.9 |
| COP relative to reference | | 104% | 103% | 103% | 102% | 102% | 102% |
| Capacity relative to reference | | 86% | 95% | 103% | 109% | 115% | 119% |
| Discharge temperature difference from reference | | −2.9 | 0.0 | 2.5 | 5.0 | 7.7 | 10.8 |
| GWP | | 138 | 205 | 272 | 339 | 406 | 474 |

TABLE 4

Refrigeration performance modelling data for
R-1132a/R-32/R-1234yf ternary system containing 20% R-1132a

| | | VDF | | | | | |
|---|---|---|---|---|---|---|---|
| | | 20 | 20 | 20 | 20 | 20 | 20 |
| | | | | R32 | | | |
| | | 20 | 30 | 40 | 50 | 60 | 70 |
| | | | | R1234yf | | | |
| Parameter | Units | 60 | 50 | 40 | 30 | 20 | 10 |
| Coefficient of Performance (COP) | | 4.97 | 4.95 | 4.93 | 4.92 | 4.92 | 4.91 |
| Volumetric cooling capacity | kJ/m³ | 5597 | 6122 | 6584 | 6986 | 7319 | 7580 |
| Discharge temperature | ° C. | 68.1 | 70.7 | 73.0 | 75.4 | 78.0 | 81.1 |
| Condenser pressure | bar | 21.4 | 23.3 | 25.0 | 26.3 | 27.4 | 28.2 |
| Evaporator pressure | bar | 8.4 | 9.4 | 10.1 | 10.8 | 11.3 | 11.7 |
| Pressure ratio | | 2.53 | 2.49 | 2.46 | 2.44 | 2.42 | 2.41 |
| Condenser glide | K | 13.6 | 11.1 | 8.9 | 7.2 | 6.0 | 5.3 |
| Evaporator glide | K | 13.1 | 11.3 | 9.3 | 7.6 | 6.4 | 5.7 |
| COP relative to reference | | 103% | 102% | 102% | 101% | 101% | 101% |
| Capacity relative to reference | | 93% | 102% | 110% | 117% | 122% | 126% |
| Discharge temperature difference from reference | | −1.1 | 1.4 | 3.8 | 6.1 | 8.8 | 11.9 |
| GWP | | 138 | 205 | 272 | 339 | 406 | 474 |

Surprisingly, the results show that it is possible to formulate ternary blends of R-1132a/R-32/R-1234yf that give acceptable performance when compared to R-410A whilst achieving lower GWP than R-32 or R-454B.

Especially preferred compositions will be those that can be classed as having "2L" flammability and which can be used on a "drop-in" or "near drop-in" basis in systems designed for R-410A. It is thought that such compositions should meet the following criteria:

Capacity of at least about 90% of R-410A
COP equivalent or higher to that of R-410A
Operating pressure in condenser equal or lower than that of R-32
Compressor discharge temperature lower than that of R-32
Temperature "glide" in evaporator and condenser less than about 10K
Worst-case composition burning velocity of less than 10 cm/s as per ASHRAE Standard 34

Other compositions which offer acceptable operating pressure and flammability but which do not meet all of these criteria may also give acceptable performance in suitably designed new equipment. For example, blends having volumetric capacity of less than 90% that of R-410A could be used by increasing compressor displacement or compressor speed. Blends having larger temperature glide than 10K could be used by employing cross-counterflow heat exchanger designs of condenser and/or evaporator.

Blends which have good performance characteristics but which exhibit class 2 flammability may also be used in systems where the charge size and application conditions make it safe for use.

The invention is defined by the following claims.

The invention claimed is:

1. A composition comprising:
   (i) from 3 to 20% by weight 1,1-difluoroethene (vinylidene fluoride, R-1132a);
   (ii) from 10 to 80% by weight difluoromethane (R-32); and
   (iii) 2,3,3,3-tetrafluoropropene (R-1234yf).

2. A composition according to claim 1 comprising:
   (i) from 3 to 20% by weight 1,1-difluoroethene (vinylidene fluoride, R-1132a);
   (ii) from 20 to 70% by weight difluoromethane (R-32); and
   (iii) from 10 to 75% by weight 2,3,3,3-tetrafluoropropene (R-1234yf).

3. A composition according to claim 1 comprising:
   (i) from 5 to 20% by weight 1,1-difluoroethene (vinylidene fluoride, R-1132a);
   (ii) from 10 to 80% by weight difluoromethane (R-32); and
   (iii) from 7 to 85% by weight 2,3,3,3-tetrafluoropropene (R-1234yf).

4. A composition according to claim 1 comprising:
   (i) from 5 to 20% by weight 1,1-difluoroethene (vinylidene fluoride, R-1132a);
   (ii) from 15 to 70% by weight difluoromethane (R-32); and
   (iii) from 10 to 65% by weight 2,3,3,3-tetrafluoropropene (R-1234yf).

5. The composition according to claim 1 comprising from 5 to 20% by weight R-1132a.

6. The composition according to claim 1 comprising from 15 to 70% by weight R-32.

7. The composition according to claim 1 comprising from 5 to 90% by weight R-1234yf.

8. The composition according to claim 7 comprising from 7 to 85% by weight R-1234yf.

9. The composition according to claim 7 comprising from 8 to 80% by weight R-1234yf.

10. The composition according to claim 9 comprising from 10 to 75% by weight R-1234yf.

11. The composition according to claim 10 comprising from 10 to 65% by weight R-1234yf.

12. The composition according to claim 1, further comprising carbon dioxide ($CO_2$, R-744).

13. The composition according to claim 12, wherein the $CO_2$ is present in an amount of from 1 to 30% by weight or from 2 to 20% by weight.

14. The composition according to claim 12, wherein the R-1132a and $CO_2$ are present in a combined amount of from 4 to 30% by weight.

15. The composition according to claim 12, wherein the R-1132a and $CO_2$ are present in a combined amount of from 5 to 20% by weight.

16. The composition according to claim 1, further comprising 1,1,2-trifluoroethene (R-1123).

17. The composition according to claim 16, wherein R-1123 is present in an amount of from 5 to 20% by weight.

18. The composition according to claim 1, wherein the composition contains less than about 8% by weight 1,1,2-trifluoroethene (R-1123).

19. The composition according to claim 18, wherein the composition contains less than about 1% by weight 1,1,2-trifluoroethene (R-1123).

20. The composition according to claim 19, wherein the composition is substantially free of 1,1,2-trifluoroethene (R-1123).

21. The composition according to claim 20, wherein the composition contains no 1,1,2-trifluoroethene (R-1123).

22. The composition according to claim 1, consisting essentially of the stated components.

23. The composition according to claim 1, further comprising a lubricant.

24. The composition according to claim 23, wherein the lubricant is selected from mineral oil, silicone oil, polyalkyl benzenes (PABs), polyol esters (POEs), polyalkylene glycols (PAGs), polyalkylene glycol esters (PAG esters), polyvinyl ethers (PVEs), poly(alphaolefins) and combinations thereof.

25. The composition according to claim 23, wherein the lubricant is selected from PAGs or POEs.

26. The composition according to claim 1, further comprising a stabiliser.

27. The composition according to claim 26, wherein the stabiliser is selected from diene-based compounds, phosphates, phenol compounds and epoxides, and mixtures thereof.

28. The composition according to claim 1, further comprising a flame retardant.

29. The composition according to claim 28, wherein the flame retardant is selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

30. A heat transfer device containing the composition according to claim 1.

31. The heat transfer device according to claim 30, wherein the heat transfer device is a refrigeration device.

32. The heat transfer device according to claim 30, wherein the heat transfer device comprises a residential or commercial air conditioning system, a heat pump or a commercial or industrial refrigeration system.

33. A process comprising the steps of:
   (a) evaporating the composition according to claim 1 in a liquid form in an evaporator to form a vapour;
   (b) compressing the vapour;
   (c) condensing the compressed vapour obtained in step (b) to form a condensate; and
   (d) returning the condensate obtained in step (c) to the evaporator;
   wherein the process is carried out in a heat transfer device.

34. The process according to claim 33, wherein the heat transfer device is a refrigeration device.

35. A sprayable composition comprising material to be sprayed and a propellant comprising the composition according to claim 1.

36. A method for cooling an article which comprises condensing the composition according to claim 1 and thereafter evaporating the composition in the vicinity of the article to be cooled.

37. A method for heating an article which comprises condensing the composition according to claim 1 in the vicinity of the article to be heated and thereafter evaporating the composition.

38. A method for extracting a substance from biomass comprising contacting biomass with a solvent comprising the composition according to claim 1 and separating the substance from the solvent.

39. A method of cleaning an article comprising contacting the article with a solvent comprising the composition according to claim 1.

40. A method of extracting a material from an aqueous solution or from a particulate solid matrix comprising contacting the aqueous solution or the particulate solid matrix with a solvent comprising the composition according to claim 1 and separating the material from the solvent.

41. A mechanical power generation device containing the composition according to claim 1.

42. A method for reducing the environmental impact arising from the operation of a product comprising an existing compound or composition, the method comprising replacing at least partially the existing compound or composition with the composition according to claim 1.

43. A method of retrofitting a heat transfer device comprising removing an existing heat transfer composition, and introducing the composition according to claim 1.

44. The method according to claim 43, wherein the heat transfer device is a commercial or industrial refrigeration device, a heat pump, or a residential or commercial air conditioning system.

45. The mechanical power generating device according to claim 42, which is adapted to use a Rankine Cycle or modification thereof to generate work from heat.

46. The method according to claim 42, wherein the use of the composition of the invention results in a lower Total Equivalent Warming Impact, and/or a lower Life-Cycle Carbon Production than is attained by use of the existing compound or composition.

47. The method according to claim 42, carried out on a product from the fields of air-conditioning, refrigeration, heat transfer, aerosols or sprayable propellants, gaseous dielectrics, flame suppression, solvents, cleaners, topical anaesthetics, and expansion applications.

48. The method according to claim 42, wherein the existing compound or composition is a heat transfer composition.

49. The method according to claim 48, wherein the heat transfer composition is a refrigerant selected from R-410A, R-454B, R-452B and R-32.

50. The method according to claim 42, wherein the product is selected from a heat transfer device, a sprayable composition, a solvent or a mechanical power generation device.

51. The method according to claim 50, wherein the product is a heat transfer device.

52. The method according to claim 51, wherein the heat transfer device is a residential or commercial air conditioning system, a heat pump or a commercial or industrial refrigeration system.

* * * * *

UNITED STATES PATENT AND TRADEMARK OFFICE
CERTIFICATE OF CORRECTION

PATENT NO. : 11,773,308 B2
APPLICATION NO. : 17/465304
DATED : October 3, 2023
INVENTOR(S) : Robert E. Low It is certified that error appears in the above-identified patent and that said Letters Patent is hereby corrected as shown below:

In the Specification

Column 6, Line 55, delete "dibromopropyl" and insert in its place --dibromopropyl--.

Column 9, Line 46, delete "00$_2$" and insert in its place --CO$_2$--.

In the Claims

Column 16, Claim 29, Line 27, delete "dichloropropyl" and insert in its place --dichloropropyl--.

Signed and Sealed this
Nineteenth Day of December, 2023

Katherine Kelly Vidal
*Director of the United States Patent and Trademark Office*